Dec. 13, 1960   L. E. KUEBLER   2,963,900
PNEUMATIC FLATNESS GAGE
Filed Nov. 27, 1956

INVENTOR
*L.E.KUEBLER*
BY *C. B. Hamilton*
ATTORNEY

United States Patent Office  2,963,900
Patented Dec. 13, 1960

2,963,900

PNEUMATIC FLATNESS GAGE

Louis E. Kuebler, Berwyn, Ill., assignor to Western Electric Company, Incorporated, New York, N.Y., a corporation of New York Filed Nov. 27, 1956, Ser. No. 624,560

2 Claims. (Cl. 73—37)

This invention relates to pneumatic flatness gages and more particularly to pneumatic gages for measuring flatness and roughness of surfaces.

An object of this invention is to provide a device for determining variations in surface condition.

Another object of this invention is to provide a device for measuring flatness of surfaces.

A further object of this invention is to provide a device for gaging parallelism of two surfaces.

A still further object of this invention is to provide a pneumatic gaging device having a new and novel air escapement portion which is placed in engagement with a surface for measuring the flatness and roughness of that surface.

One embodiment of the present invention for measuring the roughness and flatness of surfaces may include a block having a central aperture through which air from a constant pressure supply is exhausted onto a surface to be gaged for flatness and roughness. A plurality of grooves extend from edges of the block toward the exhaust aperture to increase the efficiency of the device and to permit the escaping air to remove foreign particles from the surface being gaged. A pneumatic gage of a well-known type is connected to the constant pressure air supply for indicating variations in the pressure and thus variations in the roughness and flatness of the surface being tested as the block is moved across the surface.

Figure 1:
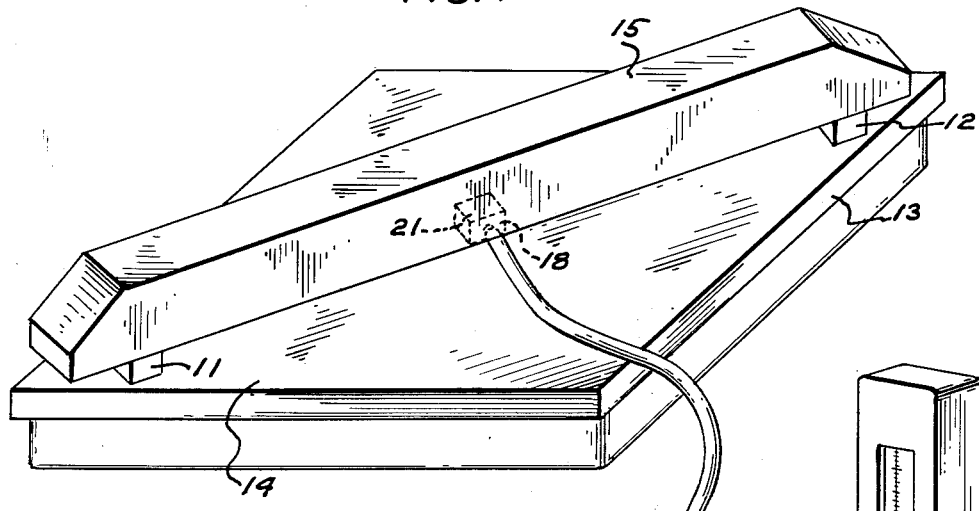
Figure 2:
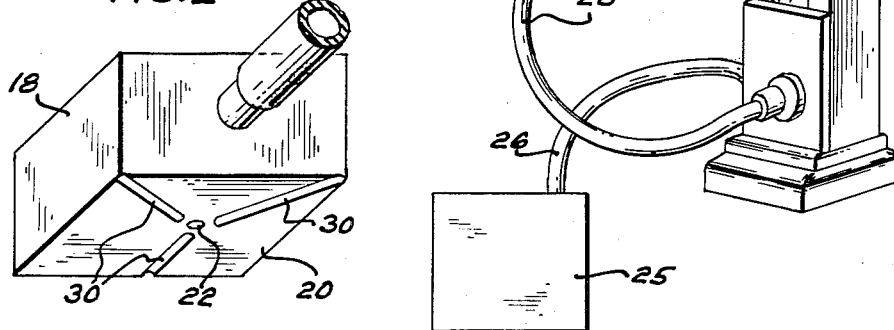

Other objects and advantages of the invention will become apparent by reference to the following detailed description and the accompanying drawing illustrating a preferred embodiment of the invention, in which:

Fig. 1 is a perspective view of the device showing a plate being gaged for flatness and roughness; and Fig. 2 is an enlarged perspective view of the block which is passed across the surface to be gaged.

Referring now in detail to the drawing, a pair of gage blocks 11 and 12 positioned on a plate 13 having a surface 14 to be gaged are shown supporting a member 15 above the plate 13. The member 15 is provided with a lower surface which is finished to a degree of flatness sufficient to serve as a standard for comparison. A block 18 having parallel lower and upper surfaces 20 and 21, respectively, is positioned on the surface 14 beneath the member 15. The surfaces 20 and 21 are ground and lapped to a very smooth, flat finish, the accuracy of which, for example, may be within five millionths of an inch. The distance between the surfaces 20 and 21 is slightly less than the thickness of the gage blocks 11 and 12; for example, the distance between the surfaces 20 and 21 may be 0.0007 inch less than the thickness of the gage blocks. An aperture 22 in the block 18 interconnects the lower surface 20 and one side of the block 18 and serves as an air nozzle.

A pneumatic gage 24 of a well-known type is shown connected to a constant pressure air supply 25 and to the block 18 by hoses 26 and 28, respectively, whereby air passes through the hose 26, the gage 24, the hose 28, and the aperture 22, in that order. As the air leaves the aperture 22 it passes between the lower surface 20 of the block 18 and the surface 14. A plurality of grooves 30 extend from edges of the block 18 across the lower surface 20 toward the aperture 22. When the block 18 is placed on the surface 14 of the plate 13 with the lower surface 20 in engagement with or spaced slightly from the surface 14 of the plate 13, air escaping through the aperture 22 passes through the grooves 30 and removes foreign particles from the surface 14. The grooves 30 also reduce the effective area of the lower surface 20 to thereby increase the accuracy of the device.

In operation of the device, gage blocks 11 and 12 are positioned on the surface 14 of the plate 13 and the member 15 is positioned on the blocks 11 and 12 as illustrated in Fig. 1. The block 18 is then positioned beneath the member 15 with its lower surface 20 in engagement with the surface 14 of the plate 13. Compressed air from the constant pressure supply 25 is then passed through the aperture 22 in the block 18 as above described. The air leaving the aperture 22 raises the block 18 to bring its upper surface 21 into engagement with the flat lower surface of the member 15, thus causing the lower surface 20 of the block 18 to be slightly spaced from the surface 14 to be gaged. The block 18 is then moved across the surface 14 of the plate 13, beneath the member 15. If the surface 14 of the plate 13 is uneven or not flat or is not parallel to the lower surface of the member 15, the rate of air flow from the aperture 22 will be varied and this fact will be indicated by the pneumatic gage 24.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for gaging the flatness and roughness of surfaces of workpieces, which comprises an elongated bar, a pair of supports for supporting opposite ends of the bar at predetermined distances from a surface of a workpiece to be gaged, a gage element having a flat planar face facing the surface of the workpiece, said gage element being arranged to traverse the length of the bar and designed to cooperate with the bar for retaining the planar face a predetermined distance from and parallel to an imaginary, faultless plane surface of the workpiece, said gage element having a central circular aperture opening on said planar face thereof and connecting with a port formed in one of the side walls of the gage element, said gage element also having formed in said planar face a plurality of grooves extending from outer edges thereof to points substantially equidistant from the central circular aperture for reducing the effective gaging area of the gage element to a narrow annulus surrounding said aperture, a constant-pressure air supply means, pneumatic gage means responsive to variations in air pressure, and means interconnecting the air supply means with the pneumatic gage means and the port in the gage element so that air passes from said air supply means through the pneumatic gage means to the aperture in the gage element and then passes between the planar face of the gage element and the surface of the workpiece to be gaged, said pneumatic gage means being responsive to changes in the rate of the air flow through the aperture in the gage element, the rate of air flow in turn being dependent upon the spacing between the planar face of the element and the surface of the workpiece.

2. A device for gaging the flatness and roughness of surfaces of workpieces, which comprises an elongated bar having a straight planar lower surface, a pair of supports for supporting opposite ends of the lower surface of the bar at equal predetermined distances from the surface of the workpiece to be gaged, a gage element in the shape of a parallel-piped having a height slightly less than the distance between the lower surface of the bar and the surface of the workpiece, said gage element being designed and arranged to traverse the length of the bar in a space between the lower surface of the bar and the surface of the workpiece in a manner such that the top face of the gage element is always in contact with the lower surface of the bar while the opposite lower face of the gage element faces the surface of the workpiece and is parallel to a plane of an imaginary faultless plane surface of the workpiece, said gage element having a central circular aperture opening on the lower face thereof and connecting with a port formed in one of the side walls of the gage element, said gage element also having formed in said lower face a plurality of grooves extending from outer edges thereof to points substantially equidistant from the central circular aperture for reducing the effective gaging area of the gage element to a relatively narrow annulus surrounding said aperture, a constant-pressure air supply means, pneumatic gage means responsive to variations in air pressure, and means interconnecting the air supply means with the pneumatic gage means and the port in the gage element so that air passes from said air supply means through the pneumatic gage means to the aperture in the gage element and then passes between the lower face of the gage element and the surface of the workpiece to be gaged, said pneumatic gage means being responsive to changes in the rate of the air flow through the aperture in the gage element, the rate of air flow in turn being dependent upon the spacing between the lower face of the element and the surface of the workpiece.

References Cited in the file of this patent

UNITED STATES PATENTS

| | | |
|---|---|---|
| 2,375,600 | Watterbot | May 8, 1945 |
| 2,417,988 | Mooney | Mar. 25, 1947 |
| 2,465,035 | Polk et al. | Mar. 22, 1949 |
| 2,479,606 | Douglass | Aug. 23, 1949 |
| 2,637,200 | Adkins | May 5, 1953 |
| 2,669,864 | Brewster | Feb. 23, 1954 |

FOREIGN PATENTS

| | | |
|---|---|---|
| 658,754 | Great Britain | July 14, 1948 |